United States Patent [19]

Rayborn et al.

[11] Patent Number: 5,114,597

[45] Date of Patent: * May 19, 1992

[54] METHOD OF MAKING A DRILLING FLUID CONTAINING CARBON BLACK IN A DISPERSED STATE

[75] Inventors: Jerry J. Rayborn, Franklintown, La.; J. Phillip Dickerson, McComb, Miss.

[73] Assignee: Sun Drilling Products Corporation, Belle Chasse, La.

[*] Notice: The portion of the term of this patent subsequent to May 19, 2007 has been disclaimed.

[21] Appl. No.: 482,852

[22] Filed: Feb. 22, 1990

[51] Int. Cl.$^5$ ............... E21B 43/00; E21B 33/13
[52] U.S. Cl. ............... 507/126; 166/285; 166/294; 507/106; 507/107; 507/138; 507/139
[58] Field of Search ............... 252/8.51, 8.511, 8.512, 252/8.514; 166/285, 294

[56] References Cited

U.S. PATENT DOCUMENTS

| | | | |
|---|---|---|---|
| 2,241,255 | 5/1941 | Garrison | 166/276 |
| 2,605,222 | 7/1952 | Jones | 252/8.511 |
| 2,773,031 | 12/1956 | Tailleur | 252/8.515 |
| 2,805,991 | 9/1957 | Tailleur | 252/8.515 |
| 2,812,161 | 11/1957 | Mayhew | 252/8.512 |
| 2,854,214 | 9/1958 | McArthur et al. | 166/288 |
| 2,867,540 | 1/1959 | Harris | 106/307 |
| 2,885,360 | 5/1959 | Haden et al. | 252/28 |
| 3,089,846 | 5/1963 | Pitchford | 252/8.51 |
| 3,215,628 | 11/1965 | Peacock | 252/8.51 |
| 3,264,214 | 8/1966 | Stratton | 252/8.51 |
| 3,322,668 | 5/1967 | Fontenot et al. | 252/8.51 |
| 3,385,789 | 5/1968 | King | 252/8.51 |
| 3,412,792 | 11/1968 | Parker et al. | 166/274 |
| 3,559,735 | 2/1971 | Corrin | 166/275 |
| 3,618,664 | 11/1971 | Harvey | 166/274 |
| 3,724,565 | 4/1973 | Kelly, Jr. | 166/294 |
| 3,727,412 | 4/1973 | Marx et al. | 166/294 |
| 3,788,406 | 1/1974 | Messenger | 175/72 |
| 3,998,270 | 12/1976 | Rodewald | 166/275 |
| 4,108,779 | 8/1978 | Carney | 252/8.515 |
| 4,385,999 | 5/1983 | McCrary | 252/8.51 |
| 4,391,329 | 7/1983 | Gallus | 106/90 X |
| 4,501,329 | 2/1985 | DePreister | 166/292 |
| 4,514,308 | 4/1985 | Clampitt et al. | 252/8.51 |
| 4,671,883 | 6/1987 | Connell et al. | 252/8.515 |
| 4,957,557 | 9/1990 | Dimitri | 106/123.1 |

Primary Examiner—John S. Maples
Assistant Examiner—C. Sayala
Attorney, Agent, or Firm—Finnegan, Henderson, Farabow, Garrett & Dunner

[57] ABSTRACT

A process for the manufacture of a water based drilling fluid additive comprising the steps of: (a) mixing hydrophobic carbon black and either a surfactant or a dispersant and (b) shearing the mixture of step (a) under a sufficiently high mechanical shear for a sufficient time to convert the hydrophobic carbon black into hydrophilic carbon black. This invention is also directed to a water based drilling fluid additive prepared according to the above process and the use of the additive in a water based drilling fluid.

53 Claims, No Drawings

METHOD OF MAKING A DRILLING FLUID CONTAINING CARBON BLACK IN A DISPERSED STATE

FIELD OF THE INVENTION

The present invention relates to a drilling fluid additive to provide enhanced fluid loss properties, enhanced wall cake thickness, enhanced bore hole stability, enhanced temperature stability, enhanced defoaming qualities, and enhanced film forming qualities to the drilling fluid.

BACKGROUND OF THE INVENTION

In drilling wells for the purpose of producing oil or gas from subterranean deposits, a fluid known as drilling mud is used to perform several functions necessary to successfully complete each well. This drilling fluid or mud performs many functions such as lubricating the drill string, cleaning the bore hole, and exerting sufficient pressure to the sides of the bore hole to prevent the entrance of liquids or gases into the bore hole from the formation being penetrated.

The drilling fluid must have a low fluid loss to prevent excessive loss of fluid into the formation by depositing an impervious filter cake on the sides of the bore hole. The thickness of the filter cake is usually directly proportional to the volume of fluid loss. Therefore, the lower the fluid loss the thinner the filter cake. Maintaining the diameter of the bore hole being drilled is critical to a successful operation. If the fluid loss is high, then the wall cake will be thick and therefore, the desired diameter of the well bore will be reduced.

Fluid loss additives most commonly used to control the fluid loss and also the wall cake thickness are bentonite clays, polymers, lignites, and surfactants.

Carbon black is basically pure carbon which exists in extremely small particle diameters of approximately 13 to 75 millimicrons. Carbon black particles have a high surface area. The surface area of a carbon black particle is approximately 25 to 500 square meters per gram and has an oil absorptive capacity of 45 to 300 cc per 100 grams.

Carbon black is organophilic and has an extremely high affinity for oils, phenols, alcohols, fatty acids, and other long carbon chain products normally used in drilling fluids.

Carbon black is insoluble and maintains its individual particle identity through mixing and handling procedures commonly used in the drilling mud industry. Carbon black will remain completely stable and finite at temperatures up to 3000° F. The hardness of carbon black, in addition to its high affinity for lubricating substances, makes it an excellent carrier to extremely tight fittings, such as a metal to metal contact. Coated with lubricant, the ultra-fine particle size penetrates openings and scratches not normally penetrable with other solids in the drilling fluid system.

However, carbon black that has not been chemically treated is basically hydrophobic and will not readily mix with water or water based drilling fluids. Thus, it is difficult to use carbon black as an effective drilling fluid additive.

SUMMARY OF THE INVENTION

Accordingly, one object of the present invention is to provide a new and improved method of applying carbon black based products to the drilling fluid to thereby drastically reduce the screening of the carbon black out of the drilling fluid as the drilling fluid passes through the rig shaker.

In fact, the instant invention will allow 99.9% of this carbon black based material to pass through a 200 mesh shaker screen. This reduced screening allows the carbon black based material to remain in the drilling fluid system indefinitely and creates a more economical and environmentally safe method of achieving the benefits of the carbon black.

Another object of the present invention is to provide a carbon black dispersion which provides an improved particle size distribution of the carbon black particles.

Another object of this invention is to provide a method of adding the carbon black product to the drilling fluid in such a manner that the person adding the product will not be subjected to the fine dust while adding the product in a dry form through the mud hopper on the drilling rig.

Another object is to improve the lubricating properties of the drilling fluid.

Another object is to improve the rheology properties of the drilling fluid.

A still further object is to improve the defoaming properties of the drilling fluid.

The present invention accordingly provides a process for the manufacture of a water based drilling fluid additive. The process comprises the steps of:

(a) mixing hydrophobic carbon black and either a surfactant or a dispersant, and (b) shearing the mixture of step (a) under a sufficiently high mechanical shear for a sufficient time to convert the hydrophobic carbon black into hydrophilic carbon black.

In one embodiment, the mixture further contains hydrophobic asphaltite that is converted by shearing into hydrophilic asphaltite.

The present invention also provides a water based drilling fluid additive prepared according to the above process.

The present invention further provides a water based drilling fluid comprising water and a water based drilling fluid additive as prepared above.

The present invention still further provides a process for enhancing the properties of a drilling fluid during the drilling of the well, by combining and circulating with a water based drilling mud, an additive as described above. The additive is mixed with the drilling mud in an amount to sufficiently reduce fluid loss and wall cake thickness.

The present invention still further provides a process of drilling a well with a rotary bit which comprises forming a bore hole with the bit while circulating a drilling mud through the bore hole. The drilling mud comprises an additive as described above and the additive is mixed with the drilling mud in an amount to sufficiently reduce fluid loss and wall cake thickness.

The process of the present invention offers a superior method of pre-dispersing and therefore wetting the surface area of the carbon black with a surfactant, emulsifier, or dispersant prior to adding the product to the drilling fluid. This process provides for a more even particle size distribution of the colloidal size particles as well as particles in the 1 to 200 micron size.

The present invention overcomes the "fish-eye" condition that occurs when fine carbon black particles are added to the drilling fluid. The fish-eye condition of the product is the balling up of many ultra-fine particles which might be partially water wet on the outside but still dry in the center of the ball. The fish-eye carbon black particle is then screened out of the drilling fluid by the rig shakers.

The present invention improves the economics and efficiency of defoamers. It is believed that the normally hydrophobic carbon black particle absorbs a film of the liquid defoamer around the entire surface area of each carbon black particle. The normally hydrophobic carbon black particle is also organophilic and preferentially wets with a hydrocarbon, usually an oil, alcohol, or like material. As this mixture or dispersion of carbon black and liquid hydrocarbon based defoamer is added to the water based drilling fluid, the carbon black particles separate and are rapidly propelled through the foam bubbles.

It is thought that these carbon black particles having a surface coating of the above mentioned defoamer is propelled over the surface of the water due to the hydrophobic nature of the defoamer coated carbon black particle. This phenomenon is thought to be due to the extremely small size of the coated carbon black particles and their lack of affinity for water. As these coated carbon black particles attempt to avoid the water in the drilling fluid, they are rapidly propelled to and fro.

This movement of the coated carbon black particles has the effect of bumping into bubbles and allowing the microcell of defoamer to break the surface tension of the bubble causing the bubble to break. Observing the addition of coated carbon black particles to the surface of water through a microscope allows one to observe this phenomenon. It is also advantageous to keep the defoamer on the surface or in the upper third portion of the drilling fluid while the drilling fluid is being agitated or mixed in the mud pits.

In the present invention, carbon black helps improve the bacterial degradation of hydrocarbons by forming microcells which allow greater surface area exposure for the bacteria to dissipate and thus destroy the hydrocarbon. It has been determined that a hydrocarbon sheen of any significant size on the surface of water is environmentally unacceptable due to the adverse effects on marine life. Almost all drilling fluids inadvertently contain a small percentage of a sheen forming hydrocarbon. This hydrocarbon could enter the drilling fluid as the drilling assembly penetrates a hydrocarbon laden sand or by simply adding it to the drilling fluid to obtain a specific benefit.

This phenomenon occurs due to the extremely small particle size of the carbon black and also due to the high absorptive properties of the carbon black.

These and other objects, features and advantages of the present invention will be made more apparent from the following description of the preferred embodiments.

DETAILED DESCRIPTION OF THE INVENTION

Reference will now be made in detail to the presently preferred embodiments of the invention.

In accordance with the present invention of manufacturing a water based drilling fluid additive, hydrophobic carbon black is mixed with a surfactant or dispersant. This mixture is then sheared under a sufficiently high mechanical shear for a sufficient time to convert the hydrophobic carbon black into hydrophilic carbon black.

In one embodiment, hydrophobic asphaltite is mixed with the hydrophobic carbon black and the surfactant or dispersant. Then, this mixture is sheared under a sufficiently high mechanical shear for a sufficient time to convert both the hydrophobic carbon black and hydrophobic asphaltite into hydrophilic carbon black and hydrophilic asphaltite.

As a result, the surface area of the carbon black is wetted and hydrophilic. This allows the carbon black product to remain dispersed and separated into individual particles which stack or plate out on the side of the well bore to reduce fluid loss. These finely dispersed, surface coated particles act as excellent plugging agents for improved fluid loss control. Similar advantageous properties are imparted to the asphaltite when it is present.

In the present invention, the carbon black particles and asphaltite, if present, are in a state of dispersion having an average particle size much finer than their original size due to the shearing action in the environment of the surfactant or dispersant. In the present invention, the carbon black particles are in a state of dispersion having an average particle size much finer than the other drilling fluid additives. The carbon black particles, and asphaltite, if present, become dispersed into much finer particles which expose more surface area. This surface area is then exposed to the surfactant or dispersant which converts the hydrophobic carbon black particles, and hydrophobic asphaltite, if present, into hydrophilic carbon black particles and, hydrophilic asphaltite particles, respectively. The asphaltite and carbon black product thereby readily mixes and disperses with any water based drilling fluid.

Any inherently hydrophobic asphaltic material can be used in the present invention. A high grade mined pulverized gilsonite is preferred.

Preferred carbon black which can be used in the present invention is carbon black produced by furnace processes that range in size from 8 $m^2/gr$ to 150 $m^2/gr$ as determined by the nitrogen adsorption method or carbon black ranging in size from 35 cc/100 gram to 200 cc/100 gram as measured by DBP (Dibutylphthalate) absorption.

A more preferred carbon black which can be used in the present invention is carbon black in the particle size range of 70–120 $m^2/gram$ as determined by the nitrogen adsorption method or 75–125 cc/100 grams as determined by the DBP (Dibutylphthalate) absorption method.

Surfactants of the present invention can be selected from, for example, ethoxylated phenols, alcohols, glycols, or fatty acid type materials. A preferred surfactant is an ethoxylated glycol type surfactant. Dispersants of the present invention can be selected from, for example, potassium hydroxide, sodium hydroxide, or lignitic type materials. The surfactants and dispersants are either liquid or solid but are preferably liquid.

The mixture of the carbon black and the surfactant or dispersant are subjected to an extremely high mechanical shear to impart hydrophilic properties to the carbon black. The mixture should preferably be subjected to a shear of at least 1700 rpms for at least 60 minutes. When present in the mixture, the hydrophobic asphaltite is likewise sheared.

A typical method of shearing the liquid mixture is by using a high speed mechanical disperser such as a ROTOSTAT® 200XP-200, manufactured and sold by Admix, Inc. of Londonderry, N.H., U.S.A.

Optionally, the mixture comprising carbon black obtained after the shearing process may be adjusted to a pH of about 8 before the mixture is added to the drilling mud. The pH adjustment is a means to further disperse the solids of the invention in the liquid phase.

The carbon black is preferably used in an amount of about from 5% to 90% by weight of the additive mixture. About 50% by weight of the carbon black in the additive mixture is especially preferred.

If a surfactant is employed, the surfactant is preferably used in an amount of about from 5% to 90% by weight of the additive mixture. About 35% by weight of the surfactant in the additive mixture is especially preferred.

If a dispersant is employed, the dispersant is preferably used in an amount of about from 1% to 50% by weight of the additive mixture. About 10% by weight of the dispersant in the additive mixture is especially preferred.

In one embodiment, the additive material further comprises asphaltite in an amount of about from 5% to 80% by weight of the mixture. About 40-70% by weight of the asphaltite in the additive mixture is especially preferred.

The combination embodiment of utilizing asphaltite ory, it is believed that these colloidal particles function to bridge or plug the micro fractions of the well bore.

The additive mixture is mixed with the drilling mud in an amount to sufficiently reduce fluid loss and wall cake thickness. The additive mixture is preferably used in from about ½% to about 30% by volume of the drilling mud. The additive mixture is more preferably used in from about 2% to about 5% by volume of the drilling mud.

The additive can also include other components that are inherently hydrophobic prior to the shearing step.

The additive can be utilized in drilling fluids while drilling oil wells, gas, wells, mineral wells, water wells, or any other earth boring operation.

The specific examples below will enable the invention to be better understood. However, they are given merely by way of guidance and do not imply any limitations.

EXAMPLE 1

Improved high pressure and temperature fluid loss and improved low pressure fluid loss The fluids in Table 1 below were circulated through a 100 mesh screen 25 times, and then tests were run on the fluids in accordance with Table 1.

TABLE 1

DECREASE IN HIGH AND LOW PRESSURE WATER LOSS
CARBON BLACK ONLY ADDITIVE VS CARBON
BLACK & ASPHALTITE COMBINATION ADDITIVE

| | BASE MUD | 2% BY VOLUME CARBON BLACK ONLY ADDITIVE | PERCENT IMPROVEMENT | 2% BY VOLUME CARBON BLACK & ASPHALTITE COMBINATION ADDITIVE* | PERCENT IMPROVEMENT OVER BASE MUD |
|---|---|---|---|---|---|
| 100 psi fluid loss @ 80° | 25.6 cc | 15 cc | 41% | 10.5 cc | 59% |
| 500 psi fluid loss @ 300° | 69.5 cc | 31.8 cc | 54% | 22 cc | 68% |

*Known as BLACKNITE$^{TM}$ - about 30-40% dry weight carbon black and 70%-60% dry weight asphaltite and carbon black together can lead to improved results over either carbon black or asphaltite alone. For example, in a mixture of approximately 60-70% by dry weight of asphaltite and about 30-40% by dry weight of carbon black, the mixture contains about 24.8% of particles smaller than 6 microns whereas asphaltite alone contain about 5.8% of particle smaller than 6 microns. The combination embodiment contains about 14.2% of particles smaller than 2 microns which would be considered colloidal in size. Not wishing to be bound by the- Approximately 99.9% of the present invention additive remained in the drilling fluid after 25 circulations. These calculations were made by collecting the solid product trapped on the 100 mesh screen. No appreciable solid product was detected.

EXAMPLE 2

Decrease in the filer cake thickness

TABLE 2

DECREASE IN FILTER CAKE THICKNESS
CARBON BLACK ONLY ADDITIVE VS
CARBON BLACK & ASPHALTITE COMBINATION ADDITIVE

| | BASE MUD | 2% BY VOLUME CARBON BLACK ONLY ADDITIVE | PERCENT IMPROVEMENT | 2% BY VOLUME CARBON BLACK & ASPHALTITE COMBINATION ADDITIVE* | PERCENT IMPROVEMENT OVER BASE MUD |
|---|---|---|---|---|---|
| 100 psi fluid loss @ 80° | 9.2 | | | | |
| Cake Thickness | 4/32 | 3/32 | 25% | 2/32 | 50% |
| 500 psi fluid loss @ 300% | 31 | | | | |
| Cake Thickness | 11/32 | 8/32 | 27% | 5/32 | 55% |

*Known as BLACKNITE$^{TM}$ particles smaller than 2 microns which would be considered colloidal in size. Not wishing to be bound by the- This invention reduces the thickness of the filter cakes. The uniform individual particle size distribution provided better compaction medium which restricted the flow of liquids from the drilling fluid.

EXAMPLE 3

Improved lubricity of the drilling fluid-carbon black

TABLE 3

| PLATE PRESSURE (lbs) | BASE MUD (amperes) | ADDITION OF 2% INVENTION (amperes) | PERCENT REDUCTION |
|---|---|---|---|
| 100 | 14 | 5 | 64% |
| 200 | 26 | 9 | 65% |
| 300 | 35 | 15 | 57% |
| 400 | 44 | 21 | 52% |
| 500 | 60 | 31 | 48% |
| 600 | SEIZURE | 44 | DID NOT SEIZE |

The lubricity refers to the lubricity characteristics of the drilling fluid in contact with the drill stem and bore hole walls. The drilling fluid lubricity was measured by the ability of the drilling fluid to reduce the coefficient of friction between two surfaces with the drilling fluid between the surfaces. The present invention reduced lubricity because it formed a film between the surfaces while minimizing wall cake build up.

EXAMPLE 4

Improved temperature stability of the flow properties of the drilling fluid-carbon black The following results in Table 4 were achieved with the use of 13.5 ppg field water based drilling fluid.

TABLE 4

| | @ 100° F.: | | HOT ROLLED 16 HRS @ 275° F. | |
|---|---|---|---|---|
| | BASE SAMPLE | 1% INVENTION | BASE SAMPLE | 1% INVENTION |
| PV | 32 | 26 | PV  38 | 23 |
| YP | 7 | 5 | YP  10 | 3 |
| GELS | 2/4 | 1/2 | GELS  2/6 | 0/1 |

PV = plastic viscosity
YP = yield point
GELS = gel strength

The reduction in yield from 7 to 5@100° F. and from 10 to 3@275° F. show that there were considerable improvements in rheology and gel strength controls. Thus, the invention also shows an added benefit of thinning drilling fluids.

Accordingly, this invention provides individual carbon black particles which plug off microfractures in the drilled formation to shut-off intrusion of the fluid into the formation. This invention therefore decreases the amount of capillary attractive forces present in the microfractures of the well bore. Not wishing to be bound by theory, it is believed that the extremely small particle size of the carbon black allows it to penetrate and bridge the fracture in the shale plane at the initial source. Other particles in the drilling fluids are too large to accomplish this.

It would be apparent to those skilled in the art that various modifications and variations can be made in the present invention without deviating from the scope or spirit of the invention. Thus, it is intended that the present invention covers the modifications and variations of this invention provided that these come within the scope of the following claims or their equivalents.

What is claimed is:

1. A process for the manufacture of a water based drilling fluid additive comprising the steps of:

(a) mixing hydrophobic carbon black and either a surfactant or a dispersant, and (b) shearing the mixture of step (a) under a sufficiently high mechanical shear for a sufficient time to convert the hydrophobic carbon black into hydrophilic carbon black.

2. A process for the manufacture of a water based drilling fluid additive according to claim 1, further comprising adding hydrophobic asphaltite to the mixture in step (a) and shearing in step (b) the hydrophobic asphaltite to convert it to hydrophilic asphaltite.

3. A process for the manufacture of a water based drilling fluid additive according to claim 2, wherein the asphaltite is gilsonite.

4. A water based drilling fluid additive prepared according to claim 3.

5. A water based drilling fluid additive prepared according to claim 2.

6. A process for the manufacture of a water based drilling fluid additive according to claim 1, wherein said hydrophilic carbon black is of a dimension that enables 99.9% of the carbon black to pass through a 200 mesh shaker screen.

7. A water based drilling fluid additive prepared according to claim 6.

8. A process for the manufacture of a water based drilling fluid additive as claimed in claim 1, further comprising the step of adjusting the pH of the sheared mixture of step (b) to approximately 8.

9. A water based drilling fluid additive prepared according to claim 8.

10. A process for the manufacture of a water based drilling fluid additive as claimed in claim 1, wherein the surfactant or the dispersant is a liquid.

11. A water based drilling fluid additive prepared according to claim 1.

12. A process for the manufacture of a water based drilling fluid additive as claimed in claim 1, wherein the mixture of step (a) is sheared under a mechanical shear of at least 10,000/sec for at least 1 hour.

13. A water based drilling fluid additive prepared according to claim 12.

14. A process for the manufacture of a water based drilling fluid additive as claimed in claim 1, wherein the mixture of step (a) is sheared under a mechanical shear of at least 10,000/sec for at least 2 hours.

15. A water based drilling fluid additive prepared according to claim 14.

16. A process for the manufacture of a water based drilling fluid additive as claimed in claim 1, wherein the mixture of step (a) is sheared with a mixer having an impeller tip speed of at least 40 ft/sec and the mixture of step (a) is sheared under mechanical shear of at least 10,000/sec for at least 1 hour.

17. A process for the manufacture of a water based drilling fluid additive as claimed in claim 1, wherein the mixture of step (a) is sheared with a mixer having an impeller tip speed of at least 40 ft/sec and the mixture of step (a) is sheared under a mechanical shear of at least 10,000/sec for at least 2 hours.

18. A process for the manufacture of a water based drilling fluid additive as claimed in claim 1, wherein the mixture of step (a) is sheared with a mixer operating at 1700 rpm for at least 1 hour.

19. A process for the manufacture of a water based drilling fluid additive as claimed in claim 1, wherein the mixture of step (a) is sheared with a mixer operating at 1700 rpm for at least 2 hours.

20. A process for the manufacture of a water based drilling fluid additive as claimed in claim 1, wherein said surfactant is selected from the group consisting of phenols, alcohols, glycols, and fatty acid type materials and said dispersant is selected from the group consisting of potassium hydroxide, sodium hydroxide, and lignitic type materials.

21. A water based drilling fluid additive prepared according to claim 20.

22. A process for the manufacture of a water based drilling fluid additive as claimed in claim 1, wherein said surfactant is a glycol and said dispersant is selected from the group consisting of potassium hydroxide, sodium hydroxide, and lignitic type materials.

23. A process for the manufacture of a water based drilling fluid additive as claimed in claim 1, wherein a glycol surfactant is used.

24. A process for the manufacture of a water based drilling fluid additive as claimed in claim 1, wherein the mixture of step (a) is sheared under a mechanical shear of at least 10,000/sec for at least 1 hour and said surfactant is selected from the group consisting of phenols, alcohols, glycols, and fatty acid type materials and said dispersant is selected from the group consisting of potassium hydroxide, sodium hydroxide, and lignitic type materials.

25. A process for the manufacture of a water based drilling fluid additive according to claim 24, further comprising adding hydrophobic asphaltite to the mixture in step (a) and shearing in step (b) the hydrophobic asphaltite to convert it to hydrophilic asphaltite.

26. A process for the manufacture of a water based drilling fluid additive according to claim 25, wherein the asphaltite is gilsonite.

27. A water based drilling fluid additive prepared according to claim 26.

28. A water based drilling fluid additive prepared according to claim 25.

29. A water based drilling fluid additive prepared according to claim 24.

30. A water based drilling fluid additive comprising hydrophilic carbon black and either a surfactant or a dispersant.

31. A water based drilling fluid additive as claimed in claim 30, further comprising hydrophilic asphaltite.

32. A water based drilling fluid additive as claimed in claim 31, wherein said asphaltite is gilsonite.

33. A water based drilling fluid comprising water and a water based drilling fluid additive as claimed in claim 32.

34. A water based drilling fluid comprising water and a water based drilling fluid additive as claimed in claim 31.

35. A process for enhancing the properties of a drilling fluid during the drilling of a well comprising the steps of combining and circulating with a water based drilling mud, an additive as claimed in claim 31, said additive being mixed with the drilling mud in an amount to sufficiently reduce fluid loss and wall cake thickness.

36. A process of drilling a well with a rotary bit which comprises forming a bore hole with said bit while circulating a drilling mud through said bore hole, said drilling mud comprises an additive as claimed in claim 31, said additive being mixed with the drilling mud in an amount to sufficiently reduce fluid loss and wall cake thickness.

37. A water based drilling fluid additive as claimed in claim 30, wherein said hydrophilic carbon black is of a dimension that enables 99.9% of the carbon black to pass through a 200 mesh shaker screen.

38. A water based drilling fluid comprising water and a water based drilling fluid additive as claimed in claim 37.

39. A water based drilling fluid additive as claimed in claim 30, wherein said additive has a pH of approximately 8.

40. A water based drilling fluid comprising water and a water based drilling fluid additive as claimed in claim 39.

41. A water based drilling fluid additive as claimed in claim 30, wherein the surfactant or the dispersant is a liquid.

42. A water based drilling fluid comprising water and a water based drilling fluid additive as claimed in claim 30.

43. A process for enhancing the properties of a drilling fluid during the drilling of a well comprising the steps of combining and circulating with a water based drilling mud, an additive as claimed in claim 30, said additive being mixed with the drilling mud in an amount to sufficiently reduce fluid loss and wall cake thickness.

44. A process of drilling a well with a rotary bit which comprises forming a bore hole with said bit while circulating a drilling mud through said bore hole, said drilling mud comprises an additive as claimed in claim 30, said additive being mixed with the drilling mud in an amount to sufficiently reduce fluid loss and wall cake thickness.

45. A water based drilling fluid additive as claimed in claim 30, wherein said surfactant is selected from the group consisting of phenols, alcohols, glycols, and fatty acid type materials and said dispersant is selected from the group consisting of potassium hydroxide, sodium hydroxide, and lignitic type materials.

46. A water based drilling fluid additive as claimed in claim 45, further comprising hydrophilic asphaltite.

47. A water based drilling fluid additive as claimed in claim 46, wherein said asphaltite is gilsonite.

48. A water based drilling fluid comprising water and a water based drilling fluid additive as claimed in claim 47.

49. A water based drilling fluid comprising water and a water based drilling fluid additive as claimed in claim 46.

50. A water based drilling fluid comprising water and a water based drilling fluid additive as claimed in claim 45.

51. A water based drilling fluid additive as claimed in claim 30, wherein said surfactant is a glycol and said dispersant is selected from the group consisting of potassium hydroxide, sodium hydroxide, and lignitic type materials.

52. A water based drilling fluid additive as claimed in claim 30, wherein a glycol surfactant is used.

53. A water based drilling fluid additive as claimed in claim 31, wherein 30-35 parts by weight asphaltite, 20-15 parts by weight carbon black and 5 to 90 parts by weight of a surfactant are used.

* * * * *

UNITED STATES PATENT AND TRADEMARK OFFICE
CERTIFICATE OF CORRECTION

PATENT NO. : 5,114,597

DATED : May 19, 1992

INVENTOR(S) : Jerry J. Rayborn et al

It is certified that error appears in the above-identified patent and that said Letters Patent is hereby corrected as shown below:

On the Title Page:

After Item [73] [*] Notice:          delete "2007" and insert therefor --2009--.

Signed and Sealed this

Third Day of August, 1993

Attest:

MICHAEL K. KIRK

Attesting Officer          Acting Commissioner of Patents and Trademarks